United States Patent [19]
Koehler et al.

[11] Patent Number: 5,214,832
[45] Date of Patent: Jun. 1, 1993

[54] HAND TOOL FOR APPLYING A FERRULE TO A SAFETY CABLE

[75] Inventors: Robert H. Koehler, Secaucus; William E. Koehler, North Bergen, both of N.J.

[73] Assignee: Bergen Cable Technologies, Inc., Lodi, N.J.

[21] Appl. No.: 692,569

[22] Filed: Apr. 29, 1991

[51] Int. Cl.⁵ ............................................. B23P 19/04
[52] U.S. Cl. ...................................... 29/268; 29/280; 29/282
[58] Field of Search ................. 29/268, 255, 280, 281, 29/270, 278, 203 H, 282, 268, 235, 237

[56] References Cited

U.S. PATENT DOCUMENTS

| | | |
|---|---|---|
| 1,147,845 | 7/1915 | Brooks . |
| 1,182,602 | 5/1916 | Tuohy . |
| 1,408,846 | 3/1922 | Turner . |
| 1,555,819 | 10/1925 | Baruch . |
| 1,807,479 | 5/1931 | James . |
| 2,267,532 | 12/1941 | Moberg . |
| 2,764,861 | 10/1956 | Wenk, Jr. . |
| 3,157,075 | 11/1964 | Filia . |
| 3,353,227 | 11/1967 | Kabel . |
| 3,571,888 | 3/1971 | DiFilippo .......................... 29/203 H |
| 3,639,977 | 2/1972 | Over ..................................... 29/628 |
| 3,710,610 | 1/1973 | McCaughey .................... 29/203 H |
| 3,911,970 | 10/1975 | Lundberg et al. . |
| 4,747,433 | 5/1988 | Dixon ................................ 140/150 |
| 4,966,600 | 10/1990 | Songer et al. ....................... 606/74 |
| 5,052,094 | 10/1991 | Plasse et al. ....................... 29/252 |
| 5,127,144 | 7/1992 | Plasse et al. ....................... 29/252 |

FOREIGN PATENT DOCUMENTS 2185706  7/1987  United Kingdom .
WO91/18707  12/1991  World Int. Prop. O. .

*Primary Examiner*—Bruce M. Kisliuk
*Assistant Examiner*—Eileen Morgan
*Attorney, Agent, or Firm*—Bacon & Thomas

[57] ABSTRACT

A hand tool for applying a ferrule to a safety cable is disclosed having a ferrule positioning device to position the ferrule while a safety cable is placed through the ferrule and through the tool, a mechanism for applying a tension to the cable and a mechanism to crimp the ferrule so as to attach the ferrule to the safety cable. A ferrule holding device, which may contain several ferrules is removably attachable to an elongated body of the hand tool such that one of the ferrules in the holding device is aligned with an opening defined by the elongated body. After threading the safety cable through the ferrule in the ferrule holding device and the opening in the elongated body, it is attached to a tensioning device which applies a predetermined tension to the safety cable. The tensioning device incorporates a clutch which disengages the tensioning device once the predetermined tension has been achieved. A pair of handles are pivotally attached to each other and are associated with the elongated body and a crimping punch such that when the handles are squeezed toward each other, the crimping punch deforms the ferrule to attach it to the safety cable. The hand tool according to this invention incorporates a locking device to prevent the handles from being moved toward each other until the predetermined tension has been placed in the safety cable. The clutch mechanism which disengages the tensioning device may also disengage the locking mechanism to enable the handles to be moved toward each other once the predetermined tension has been achieved. The device also incorporates a ratchet device associated with the handles to prevent the handles from returning to their initial, spaced apart positions until the ferrule has been properly crimped onto the safety cable. This positively ensures that the ferrule is properly affixed to the safety cable by preventing the return of the handles to their initial positions and the removal of the device from the ferrule.

31 Claims, 8 Drawing Sheets

HAND TOOL FOR APPLYING A FERRULE TO A SAFETY CABLE

BACKGROUND OF THE INVENTION

The present invention relates to a hand tool for applying a ferrule to a safety cable passing through a plurality of threaded fasteners to prevent the unintentional unthreading of such fasteners.

In rotary machinery having close tolerances between rotating and stationary elements, such as turbines, it is imperative that all objects, no matter how small, be kept from contact with the rotating elements of the machinery. The presence of any foreign object could result in the catastrophic failure of the entire machine.

Such machinery is inherently complex and requires many nuts, bolts, screws and other threaded fasteners to assemble all of its components. Since the operation of such machinery may involve very high rotating speeds, which may induce vibrations into the machine elements, it is necessary to provide some means for preventing the inadvertent unthreading of the numerous threaded fasteners.

It is known to apply lockwires to threaded fasteners to prevent their inadvertent unthreading. Typically, the lockwire passes through a transverse hole in at least two threaded fasteners and is twisted back on itself in alternating clockwise and counterclockwise directions between the threaded fasteners. The process is duplicated between additional threaded fasteners until the entire threaded fastener pattern has been safety wired. Following the required stringing and twisting, the wire is cut and bent into a certain position.

While the known lockwire technique has provided satisfactory results, it requires a very time consuming and laborious application process. Often the final result is unsatisfactory due to variations in the quantity and tautness of the twists, and the variations in the tension on the lock wire. It has been estimated that annual losses of approximately $10,000,000 are incurred just from re-working unacceptable lock wire assemblies.

SUMMARY OF THE INVENTION

This invention relates to a type of lockwire hand tool for applying a ferrule to a safety cable having a ferrule positioning device to position the ferrule while a safety cable is inserted through the ferrule and through the tool, a mechanism for applying a tension to the cable and a mechanism to crimp the ferrule so as to attach the ferrule to the safety cable. A ferrule holding device, which may contain several ferrules, is removably attachable to an elongated body of the hand tool such that one of the ferrules in the holding device is aligned with an opening defined by the elongated body.

After threading the safety cable through the ferrule in the ferrule holding device and the opening in the elongated body, it is attached to a tensioning device which applies a predetermined tension to the safety cable. The tensioning device incorporates a clutch which disengages the tensioning device once the predetermined tension has been achieved.

A pair of handles are pivotally attached to each other and are associated with the elongated body and a crimping punch such that when the handles are squeezed toward each other, the crimping punch deforms the ferrule to attach it to the safety cable. The hand tool according to this invention incorporates a locking device to prevent the handles from being moved toward each other until the predetermined tension has been placed in the safety cable. The clutch mechanism which disengages the tensioning device may also disengage the locking mechanism to enable the handles to be moved toward each other once the predetermined tension has been achieved.

The invention also incorporates a ratchet device associated with the handles to prevent the handles from returning to their initial, spaced apart positions until the ferrule has been properly crimped onto the safety cable. This positively ensures that the ferrule is properly affixed to the safety cable by preventing the return of the handles to their initial positions and the removal of the device from the ferrule.

DETAILED DESCRIPTION OF THE PREFERRED EMBODIMENT

Figure 1:
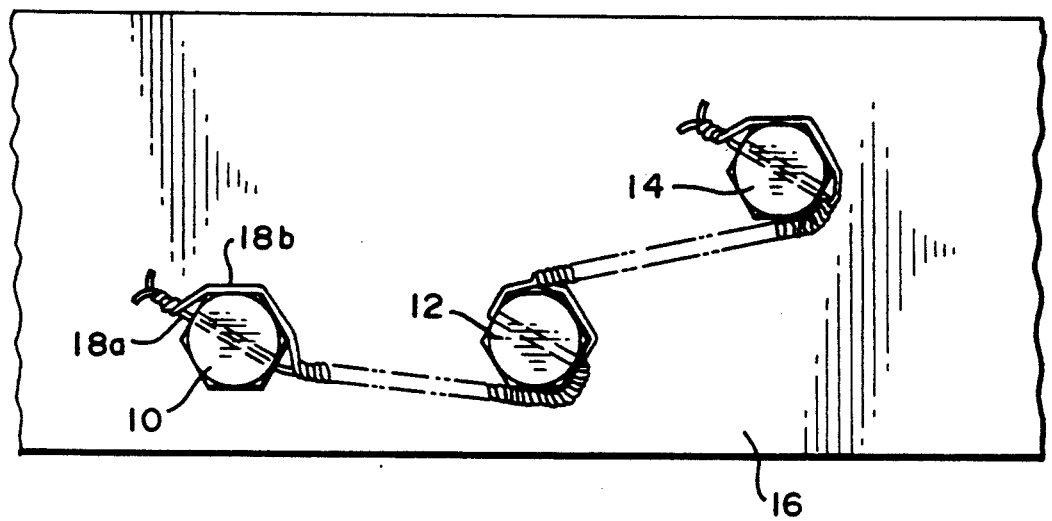
FIG. 1 is a plan view of a safety cable applied according to the known techniques.

A lock wire 18 applied in accordance with the prior art is illustrated in FIG. 1 wherein threaded fasteners 10, 12 and 14 are engaged with a portion 16 of a rotating apparatus (not otherwise shown). The lockwire 18 comprises turn wire strands 18a and 18b twisted together at one end are separated such that strand 18a passes through a transverse opening in fastener 10 while strand 18b passes around the exterior of the fastener 10. The strands are twisted together on the opposite side of fastener 10 and, again, one strand passes through a transverse opening formed in fastener 12 while the other strand passes around fastener 12. The lockwire 18 continues until the last fastener, in this particular instance fastener 14, whereupon one strand passes through a transverse opening in the fastener, while the other strand passes around the exterior of the fastener. The strands are twisted together on the opposite side of the fastener 14.

Figure 2:
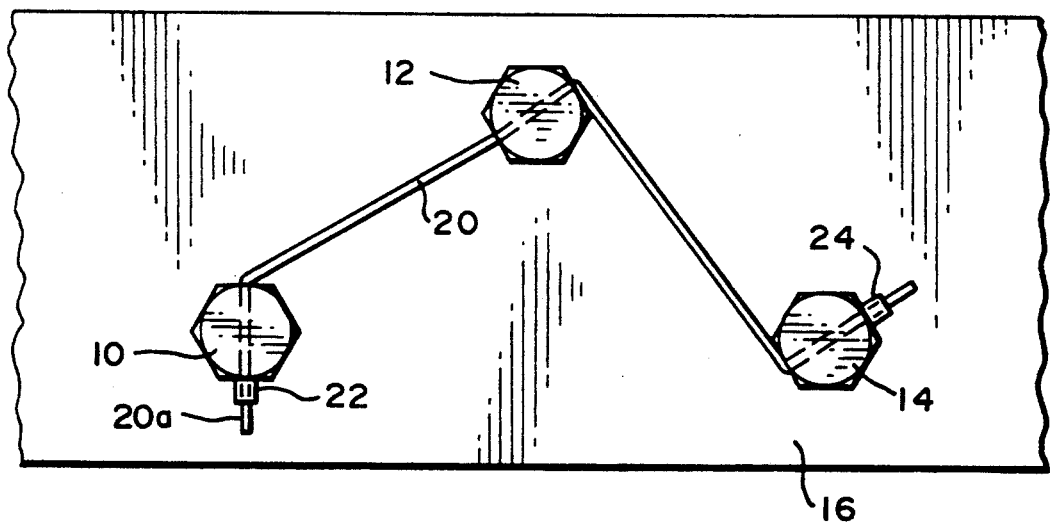
FIG. 2 is a plan view of a safety cable applied using the apparatus according to the present invention.

FIG. 2 illustrates a safety cable system applied using the apparatus according to the present invention. Threaded fasteners 10, 12 and 14 are once again engaged with the machinery portion 16. Safety cable 20 comprises a multi strand cable having a ferrule 22 affixed to end 20a. Safety cable 20 passes through transverse openings formed in the threaded fasteners 10, 12 and 14 until ferrule 22 bears against one side of fastener 10. At this point, ferrule 24 is inserted over the end of cable 20 against the side of fastener 14, a tension is applied to the safety cable 20 and the ferrule 24 is crimped onto the safety cable such that it bears against a side of the fastener 14. Safety cable 20 is then automatically trimmed. The pre-determined is tension is maintained in safety cable 20 by the contact of ferrules 22 and 24 with the sides of the threaded fasteners 10 and 14, respectively.

Figure 3:
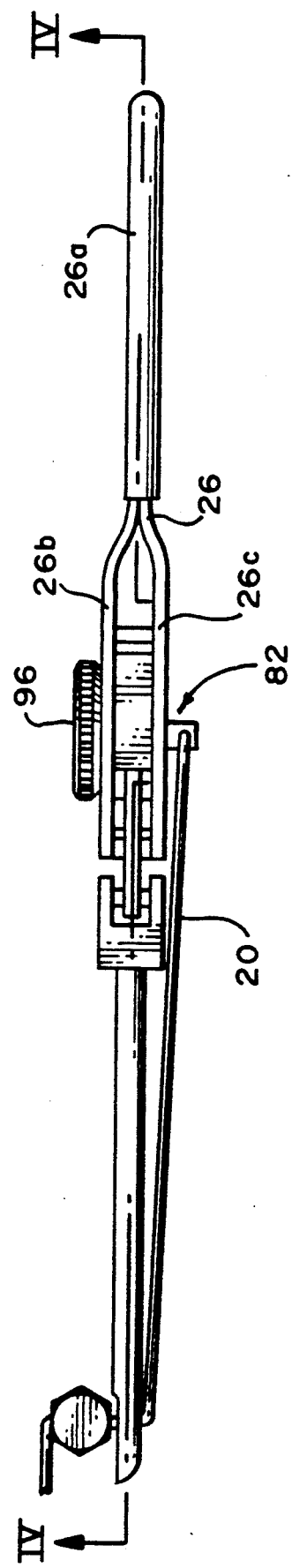
FIG. 3 is a top plan view of the hand tool according to the present invention.
Figure 4:
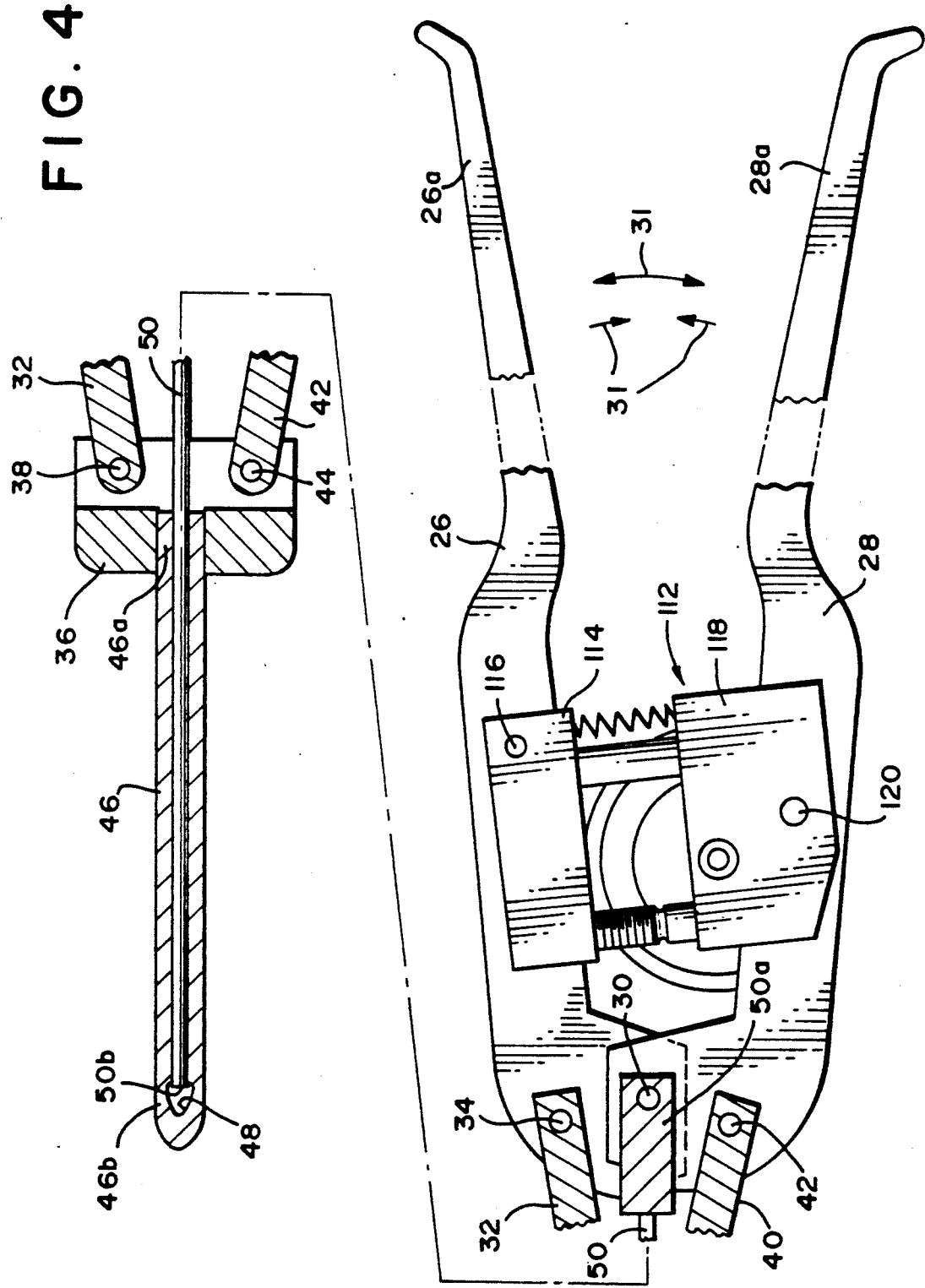
FIG. 4 is a longitudinal cross-sectional view taken along line IV—IV in FIG. 3.

As best illustrated in FIGS. 3 and 4, the hand crimping tool according to the present invention comprises a pair of handle members 26 and 28 pivotally attached together via pivot pin 30 so as to pivot about the longitudinal axis of the pivot pin 30 toward and away from each other as illustrated by arrows 31. The handle members 26 and 28 may have cushioned or coated hand gripping areas 26a and 28a, respectively, and may have bifurcated front portions with generally parallel extending portions illustrated at 26b and 26c in FIG. 3. It is to be understood that handle 28 may have a similar bifurcated construction, but with the bifurcated members located closer together such that the front portions of handle 28a may fit between portions 26b and 26c near the pivot pin 30.

Link member 32 has a first end pivotally attached to handle member 26 by a pivot pin 34, whose axis may extend generally parallel to the axis of pivot pin 30. The opposite end of link member 32 is pivotally attached to collar member 36 by a pivot pin 38.

In similar fashion, link member 40 has a first end attached to handle member 28 via pivot pin 42 and a second end pivotally attached to collar member 36 by pivot pin 44. Again, the axis of pivot pin 42 may extend parallel to that of pivot pin 30.

An elongated body 46 has a proximal end portion 46a fixedly attached to collar member 36, such as by brazing or the like. Elongated body member 46 also has a distal end portion 46b which defines an opening 48, at least a portion of which has a generally triangular configuration as illustrated in FIG. 4. Elongated body member 46 has a longitudinally extending, central opening which slidably accommodates crimping punch member 50. Crimping punch member 50 has an end 50a attached to the handle members 26 and 28 by pivot pin 30. As will be hereinafter explained in more detail, the punch member 50 is movable between a retracted position in which an opposite end portion 50b does not extend significantly into opening 48 and a crimping position in which end 50b extends into the opening 48 so as to bear against a ferrule in the opening 48 so as to crimp the ferrule onto a safety cable extending through the ferrule.

In order to use the hand tool according to the present invention, the safety cable must first be threaded through a ferrule as well as the opening defined by the elongated body of the tool; a tension must be applied to the safety cable to a predetermined value; and the ferrule must be permanently crimped onto the safety cable.

Figure 5A:
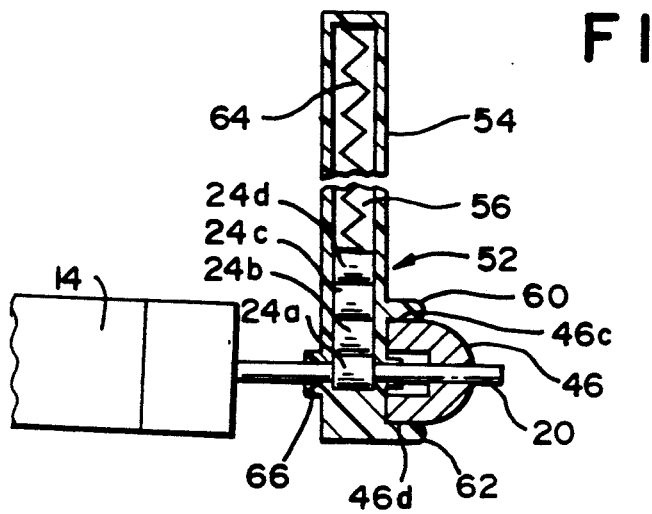
FIGS. 5A-5C are schematic illustrations of the use of a ferrule holding member to position the ferrule while threading the safety cable through the ferrule and the hand tool.
Figure 6A:
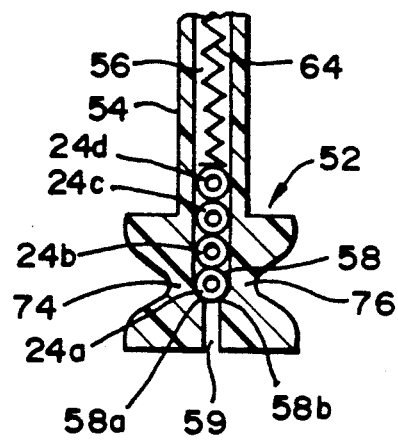
FIGS. 6A and 6B are side views of the ferrule holding member illustrating the storage and withdrawal of a ferrule from the ferrule holding device.

The first portion of the operational procedure may be carried out with the assistance of a ferrule holding member illustrated generally at 52 in FIGS. 5A–5C, 6A and 6B. The ferrule holding member 52 may have a magazine portion 54 defining a storage chamber 56 adapted to accommodate a plurality of ferrules 24. In FIGS. 5A and 6A four such ferrules 24a, 24b, 24c and 24d are illustrated, but it is to be understood that any number of such ferrules may be stored in the storage chamber 56. Ferrule holding member 52 also has an insertion chamber 58 which is defined by edge portions 58a and 58b. As can be seen in FIGS. 5A and 6A, spring 64 bears against a portion of the magazine 54 and the uppermost ferrule in the magazine (in this instance ferrule 24d) so as to urge the stack of ferrules from the storage chamber 56 into the insertion chamber 58.

Resilient lip members 60 and 62 extend from the ferrule holding member 52 and are located so as to frictionally engage surfaces 46c and 46d formed on opposite sides of elongated body member 46. When resilient lip members 60 and 62 have removably attached the ferrule holding member 52 to the elongated body 46, the insertion chamber 58 is in alignment with opening 48.

Ferrule holding member 52 may also define collar extensions 66 and 68 extending from opposite sides. Each of these extensions define an opening which is in alignment with the opening of the ferrule 24a located in the insertion chamber 58. The distal end of the opening extending through extension 66 may be beveled so as to have a generally conical shape to facilitate the threading of the end of the safety cable into and through the ferrule holding member 52.

As can be seen in FIG. 5A, the end of the safety cable 20 is placed through the opening in the extension 66 which automatically directs the cable through the opening in the ferrule 24a and out through the opening in the extension 68. The end of cable 20 is then inserted through opening 48 in the elongated body 46 as well as a smaller, generally cylindrical opening 70 which communicates opening 48 with the opposite side of elongated member 46, as illustrated in FIG. 7.

Figure 5B:
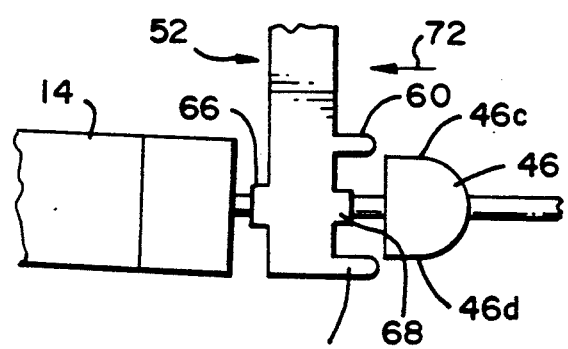
Figure 5C:
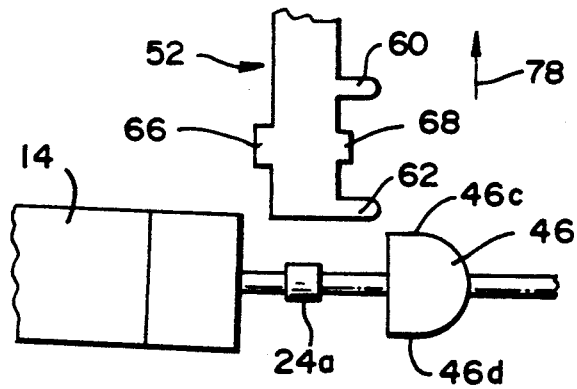
Figure 6B:
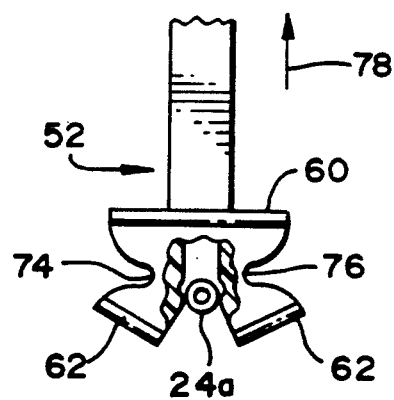

Once the desired amount of safety cable 20 has been pulled through the threaded member 14, the ferrule 24a and the elongated body 46, the ferrule holding member 52 is moved in the direction of arrow 72 in FIG. 5B so as to disengage the ferrule holding member 52 from the elongated body 46. As can be seen in FIG. 6A, ferrule holding member 52 has reduced thickness wall portions 74 and 76 located generally on opposite sides of the insertion chamber 58. These reduced thickness wall sections 74 and 76 enable the lower portion of the ferrule holding member 52 separated by slit 59 and located on either side of the insertion chamber to pivot outwardly, as illustrated in FIG. 6B, when the ferrule holding member is urged upwardly in the direction of arrow 78 as illustrated in FIG. 5C. Movement in the direction of arrow 78 allows the ferrule 24a in the insertion chamber 58, which has been threaded onto safety cable 20, to pass outwardly from the ferrule holding member 52. Once ferrule 24a has cleared the edge portions 58a and 58b, the natural resiliency of the ferrule holding member 52 returns its lower portion to the configuration illustrated in FIG. 6A to prevent other ferrules from being ejected. Spring 64 then urges the stack of ferrules downwardly such that ferrule 24b is now located in the insertion chamber.

Figure 7:
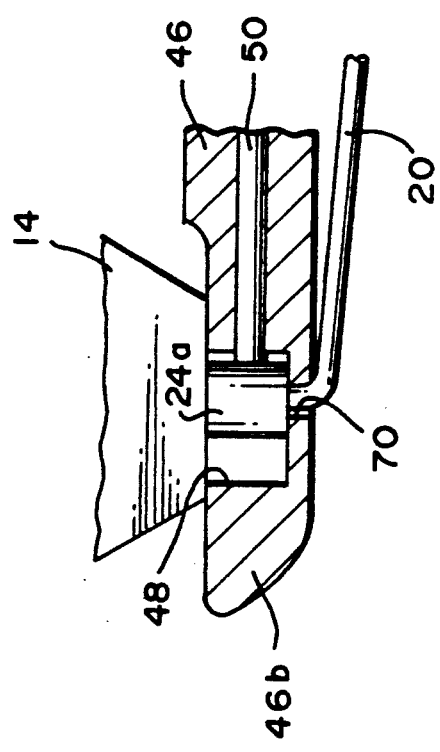
FIG. 7 is a partial, top, cross-sectional view illustrating the ferrule installed on the safety wire and inserted into the tool ready to be crimped.

Following the removal of the ferrule holding member 52, elongated body 46 is moved in the direction of arrow 80, as illustrated in FIG. 5C, to insert the ferrule 24a into the opening 48, as illustrated in FIG. 7.

At this point, it is necessary to apply a predetermined tension to the safety cable 20 before permanently attaching ferrule 24a to the cable by crimping. This is accomplished by attaching the end of safety cable 20 to a tensioning device, generally indicated at 82 in FIG. 3 and 8. The tensioning mechanism is illustrated in FIGS. 8–12. The tensioning mechanism according to the present invention comprises a one-way rotation mechanism 84, which may be any known, commercially available device. Tension member 86 is inserted through one-way rotation device 84 such that its headed portion 86a is located on one side of the mechanism 84, while a safety cable gripping portion 86b extends out the opposite side. End 86b may define a slot 88 having an enlarged, inner portion 88a so that the end of the safety cable 20 may be inserted into the slot 88 and displaced from alignment with the slot 88 in the enlarged portion 88a. Notch 89 may accommodate a C-clip (not shown) to retain the tension member 86 in the one-way rotation mechanism 84. Tension member 86 also defines a longitudinally extending central opening, which is internally threaded.

Face 90 of head portion 86a has mounted thereon at least one protrusion 92 extending therefrom. The protrusions 92 may be ball members rotatably affixed to the tension member, or members fixedly attached to and extending from the face 90. Although four such protrusions are shown (see FIG. 11) it is to be understood that more or less may be utilized without exceeding the scope of this invention.

Figure 9:
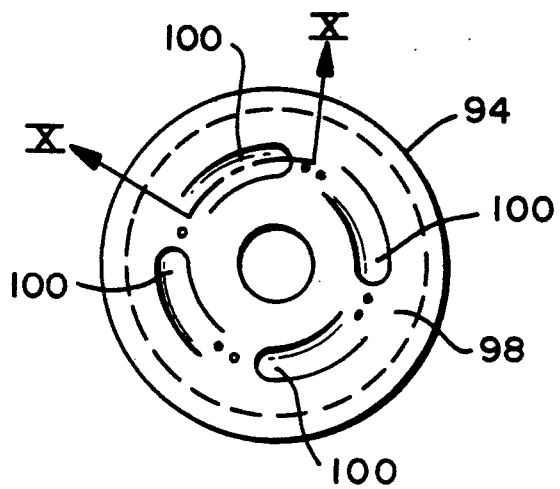
FIG. 9 is a rear view of the clutch plate viewed in the direction of arrow IX in FIG. 8.
Figure 10:
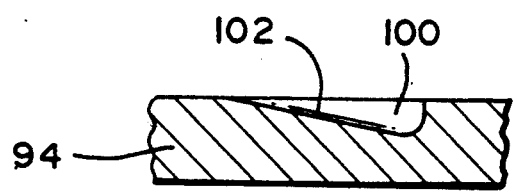
FIG. 10 is a partial, cross-sectional view taken along line X—X in FIG. 9.
Figure 11:
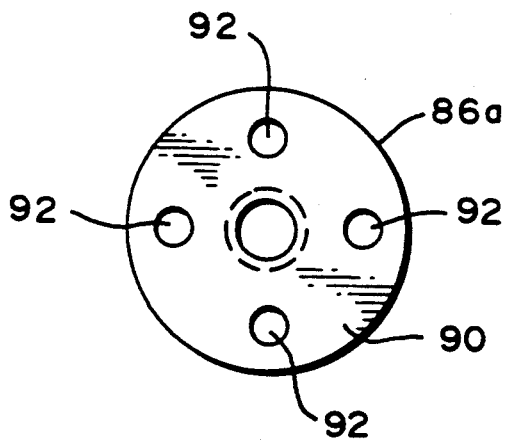
FIG. 11 is a front view of the tension member viewed in the direction of arrow XI in FIG. 8.
Figure 12:
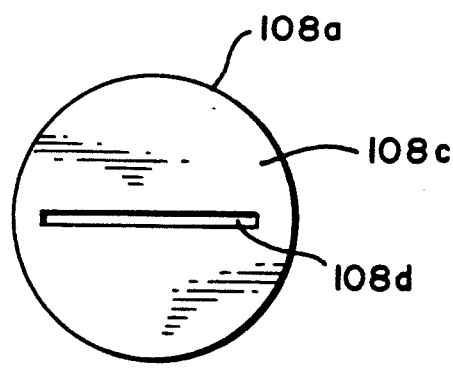
FIG. 12 is a front view of the tension adjusting screw viewed in the direction of arrow XII in FIG. 8.

Clutch plate 94 is fixedly attached to a recessed portion of winding or control knob member 96 via any known means, such as threaded fasteners, or the like. Face 98 of clutch plate 94, as illustrated in FIGS. 9 and 10, defines at least one indentation 100 having an inclined ramp surface 102. The indentations 100 are dimensioned so as to be engaged by the protuberances 92. The number of indentations is equal to the number of protuberances.

Figure 8:
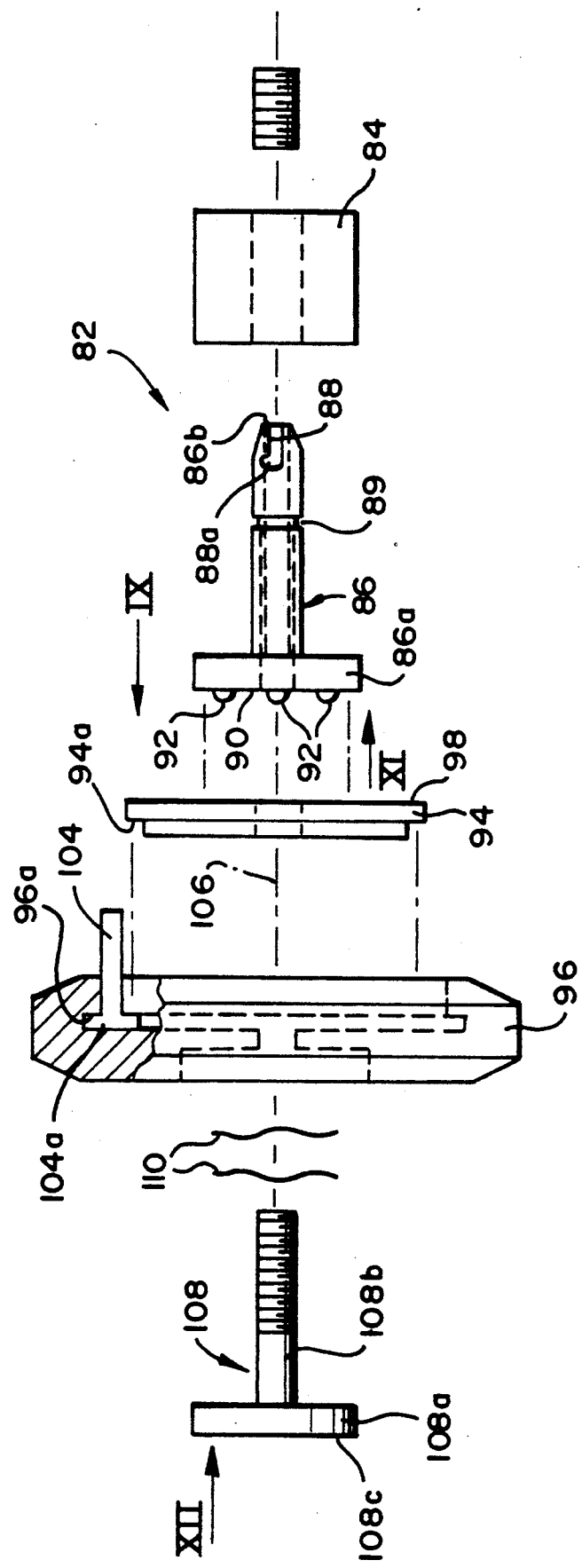
FIG. 8 is a top, exploded view of the tension mechanism according to the present invention.

A locking pin 104, whose functions will be more completely described hereinafter, is attached between the control knob 96 and the clutch plate 94. As can be seen in FIG. 8, locking pin 104 has an enlarged portion 104a which is slidably contacted by lip 96a of control knob 96 as well as lip 94a defined by the clutch plate 94. The engagement between these members is such that rotation of the control knob 96 and, consequently, the clutch plate 94 about axis 106 will not cause rotation of the locking pin 104 about the axis, but any axial movement of the control knob 96 along its rotational axis 106 will cause pin 104 to also move axially in this direction.

Tension adjusting screw 108 has a headed portion 108a and a threaded shank portion 108b which extends through the control knob 96, the clutch plate 94 and is threadingly engaged with the central opening defined by tension member 86. One or more wave spring washers 110 may be operatively interposed between the headed portion 108a of the tension adjusting screw 108 and the control knob 96. The face 108c of the tension screw 108 defines a slot 108d to facilitate rotation of the tension adjusting screw by a screwdriver or the like.

Set screw 109 may be threaded into the opposite end of the central opening in the tension member 86 so as to bear against an end of shank 108b of tension adjusting screw 108. This locks tension adjusting screw 108 in its desired location and prevents inadvertent rotation of the tension adjusting screw.

The tension mechanism works as follows. After the end of safety cable 20 has been inserted into slot 88 and enlarged end portion 88a, the control knob 96 is manually rotated about axis 106. Due to the presence of one-way rotation mechanism 84, tension member 86 and, consequently, the control knob 96 will rotate only in one direction. The biasing force of wave spring washers 110 urges the control knob 96 as well as the clutch plate 94 towards the tension member 86 along axis 106 such that the protrusions 92 drivingly engage the indentations 100. Thus, rotation of control knob causes rotation of the tension member 86 through the clutch plate 94.

Such rotation causes a safety cable 20 inserted through a ferrule while restrained against longitudinal movement to be wound upon the end 86b of the tension member 86, such winding motion increasing the tension within the safety cable 20. Once this tension reaches a predetermined level, the rotative force exerted on the tension member 86 by the engagement of the protrusions 92 with the indentations 100 becomes less than the restrictive force exerted on the tension member 86 by the safety cable 20. This prevents tension member 86 from rotating and causes the protrusions 92 to slide along inclined ramp surfaces 102 as control knob 96 is rotated. This causes axial movement of the control knob 96 along axis 106 in a direction away from the tension member 86. Once the protrusions 92 are out of engagement with the indentations 100, no further rotation of tension member 86 can take place through the control knob 96. Rotation of the tension member 86 in the opposite direction is prevented by one-way rotation mechanism 84.

The level of tension at which the protrusions 92 slide along the inclined ramp surfaces 102 may be adjusted by rotating the tension adjusting screw 108. Rotation in one direction will increase the biasing force toward the right (as shown in FIG. 8) on the control knob 96 urging it toward tension member 86 and thereby applying a greater tension to the safety cable 20 before the disengagement of the protrusions 92 from the indentations 100. Similarly, rotation of the tension adjusting screw 108 in the opposite direction will lessen the tension applied to the safety cable 20 before such disengagement takes place.

Once the proper tension has been applied to the safety cable 20, the ferrule 24a may be crimped onto the safety cable. This is achieved by manually urging handle members 26 and 28 towards each other. As illustrated in FIG. 4, such movement of the handle members 26 and 28 will cause pivot pins 34 and 42 to move around the axis of pivot pin 30. Such movement causes relative movement between the elongated body 46 and the crimping punch 50 which is attached to the pivot pin 30. As best seen in FIG. 7, moving the handles 26 and 28 towards each other will cause elongated body 46 to move toward the right with respect to crimp punch 50. The motion of the crimp punch, along with the generally triangular configuration of opening 48 deforms the ferrule 24a so as to be crimped and permanently attached to safety cable 20. The relative movement between the elongated body 46 and the ferrule 24a causes a shearing action on the safety cable 20 between the inner edge of opening 70 and the adjacent edge of the ferrule 24a. The edges are moving in opposite directions so as to exert a shear action on the safety cable 24, which shear action severs the cable after the ferrule 24a has been crimped.

Figure 13:
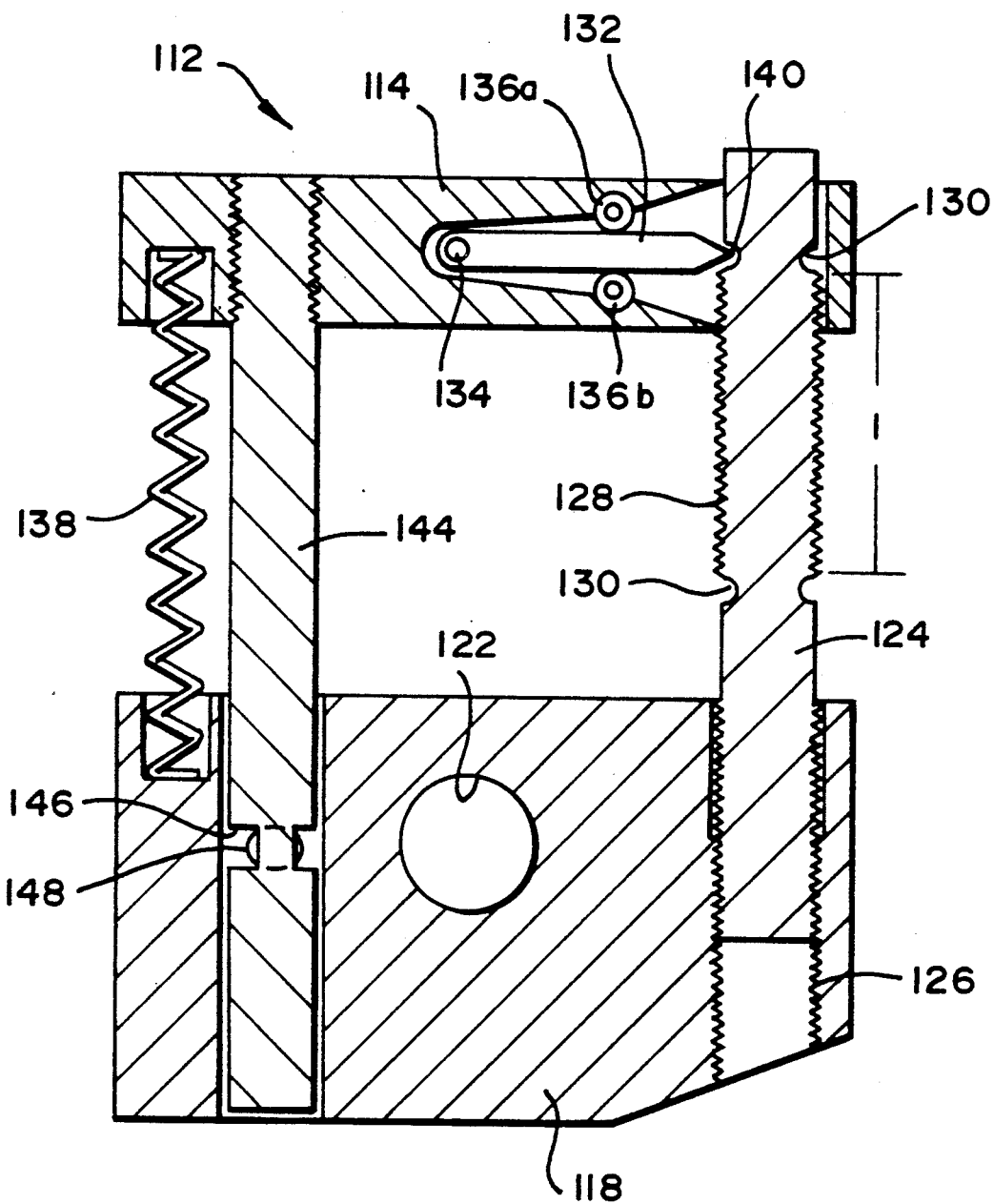
FIG. 13 is a cross-sectional view of the ratchet mechanism utilized in the present invention.

In order to prevent the movement of handle members 26 and 28 away from each other before the ferrule 24a has been permanently attached to the safety cable 20, ratchet mechanism 112 is provided. As best seen in FIGS. 4 and 13 ratchet mechanism 112 comprises a ratchet body 114 attached to handle member 26 via pivot pin 116. It also comprises a support body 118 attached to handle member 28 via pivot pin 120. Support body 118 defines a laterally extending opening 122 in which is mounted the one-way rotation mechanism 84 of the tensioning device. Ratchet member 124 is attached to the support body 118 via threads 126. Ratchet member 124 also extends through the ratchet body 114 and defines a plurality of ratchet teeth 128 extending over a length 1 of the ratchet member 124. Ratchet member 124 also defines ratchet grooves 130 located at either end of the ratchet teeth 128. The depth of ratchet teeth 130 is greater than that of ratchet teeth 128 as illustrated in FIG. 13.

Pawl 132 is pivotally attached ratchet body 114 via pivot pin 134. Resilient biasing members 136a and 136b are located on opposite sides of pawl 132 and exert a biasing force thereon urging it to the central position illustrated in FIG. 13. Compression spring 138 is operatively interposed between the ratchet body 114 and support body 118 so as to normally urge these elements apart.

Figure 14A:
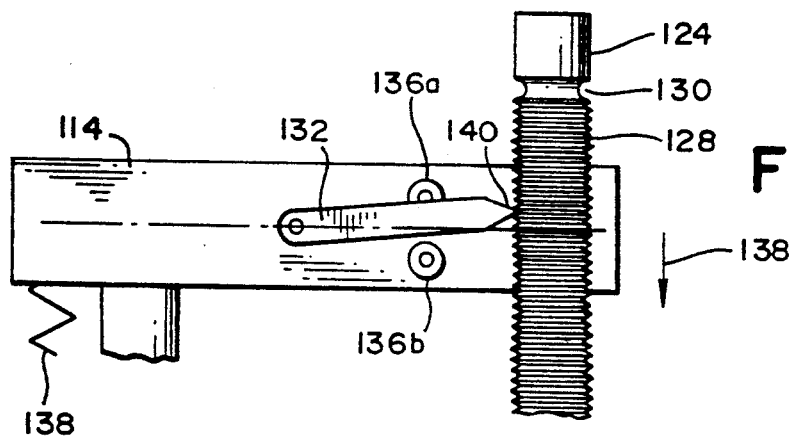
FIGS. 14A-14C are schematic illustrations of the sequential movement of the ratchet mechanism illustrating the positions of the ratchet pawl.
Figure 14B:
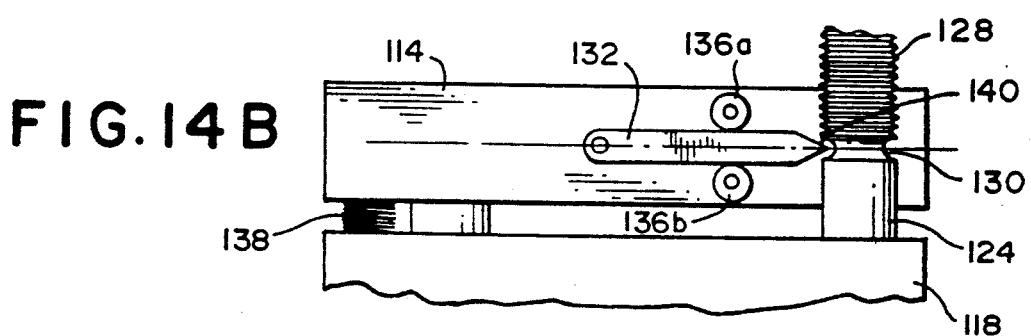
Figure 14C:
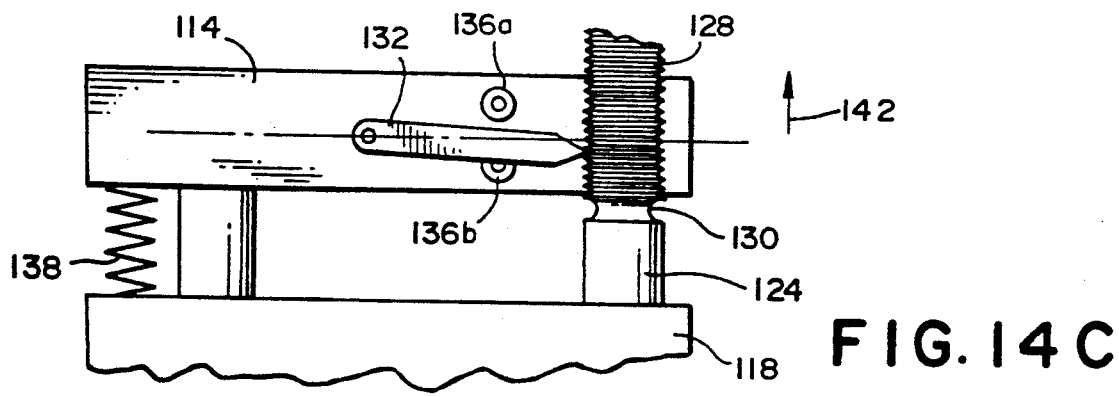

The operation of the ratchet mechanism can be seen from FIGS. 14A-14C. Movement of handle members 26 and 28 towards each other will cause ratchet body 114 and support body 118 to also move towards each other. Thus, ratchet body 114 moves in the direction of arrow 138 in FIG. 14A relative to ratchet member 124a. Pawl 132 defines an engagement edge 140 which, when the ratchet body 114 is displaced towards support body 118, engages ratchet teeth 128. The movement of ratchet body 114 will cause pawl 132 to pivot about pivot pin 134 so as to compress resilient biasing member 136a. This compression will increase the force urging the pawl 132 toward its central position illustrated in FIG. 13. However, the depth of the ratchet teeth 128 is insufficient to allow the pawl 132 to return to this position.

Thus, once the engagement edge 140 engages ratchet teeth 128, it is impossible for ratchet body 114 to move in any direction other than that indicated by arrow 138 in FIG. 14a. This prevents the handles 26 and 28 from being moved apart as long as pawl 132 is engaged with ratchet teeth 138.

Once the handles 26 and 28 have been moved towards each other sufficiently for the crimping punch 50 to have fully crimped the ferrule 24a onto the safety wire 20, the ratchet body 14 and the support body 118 will be in the positions illustrated in FIG. 14B. In this position, engagement edge 140 of pawl 132 enters the lower ratchet groove 130 which has a depth sufficient to allow the pawl 132 to be returned to its central position due to the biasing force of resilient biasing member 136a.

Once the engagement edge 140 enters the groove or ratchet tooth 130, ratchet 114 and support body 118 may move away from each other, as illustrated in FIG. 14C. Movement of ratchet body 114 relative to support body 118 in the direction of arrow 142 will bring engagement edge 140 once again into contact with ratchet teeth 128. The depth of the ratchet teeth 128 will cause the pawl 132 to pivot about pivot pin 134 and compress resilient biasing member 136b. This depth, however, is insufficient to allow the pawl 132 to return to its center position. This prevents movement of ratchet body 114 in any direction except that indicated by arrow 142. Once ratchet body 114 reaches the position illustrated in FIG. 13, the upper ratchet groove 130 will enable the pawl 132 to be returned to its center position by resilient biasing members 136a and 136b.

The invention also includes a locking device for positively preventing the movement of handles 26 and 28 towards each other until the predetermined tension has been established in safety cable 20. This is achieved by locking member 144 which may be threaded onto ratchet body 114 and slidably extend through support body 118. Locking member 144 defines a circumferential locking recess 146 which, when the handles 26 and 28 are in their fully opened position and ratchet body 114 is in the position illustrated in FIG. 13 (wherein the engagement edge 140 is located in ratchet groove 130) the locking recess 146 is in alignment with transverse opening 148 defined by support member 118. When the tension mechanism 82 is assembled and one-way rotation mechanism 84 is mounted in opening 122 through the support body 118, locking pin 104 attached to the control knob 96 extends into opening 148. The length of locking pin 104 is such that, as long as the control knob 96 is in driving engagement with the tension member 86 (indentations 100 are in driving engagement with protrusions 92), pin 104 extends through the opening 148 and into the locking recess 146. This prevents any movement of locking member 144 along its longitudinal axis, thereby preventing handles 26 and 28 from being moved toward each other.

As previously noted, once the proper tension in cable is achieved, the action of protrusions 92 moving along the inclined ramp surfaces 102 will cause control knob 96 and clutch plate 94 to move axially along the rotational axis 106. This axial movement withdraws pin 104 from engagement with the locking recess 146, thereby enabling the ratchet body and support body to be moved towards each other along with handle members 26 and 28.

The foregoing description is provided for illustrative purposes only and should not be construed as in any way limiting this invention, the scope of which is defined solely by the appended claims.

We claim:

1. Apparatus for applying a ferrule to a strand element such as a wire or a cable comprising:

a tool body; ferrule positioning means carried by the tool body for positioning a ferrule so that a strand element may be inserted through the ferrule while the ferrule is positioned on the tool body; strand tensioning means for engaging and applying a predetermined tension to a strand element inserted through a ferrule positioned on the tool body while the strand element is restrained against longitudinal movement; ferrule crimping punch means carried by the tool body and manual actuating means operatively associated with the ferrule crimping punch means for moving the ferrule crimping punch means between a retracted position and a crimping position whereat it engages and crimps a ferrule positioned in the tool body by the ferrule positioning means; and means operatively associated with the manual actuating means for preventing the ferrule crimping punch means from returning toward its retracted position until it has reached its crimping position after the punch means is moved initially towards its crimping position from its retracted position; and locking means operatively associated with the tensioning means and the manual actuating means for preventing the manual actuating means from moving the ferrule crimping punch means from its retracted position until a strand element engaged by the tensioning means has been tensioned by the tensioning means to a predetermined tension.

2. The apparatus of claim 1 wherein the tool body includes an elongated portion having a proximal end operatively associated with the manual actuating means and a distal end including the ferrule positioning means, wherein the ferrule positioning means comprises an opening for receiving and retaining a ferrule insertable therein.

3. The apparatus of claim 2 wherein the ferrule positioning means further comprises: a ferrule holding member; and means to removably attach the ferrule holding member to the elongated body portion such that a ferrule held by the ferrule holding member is aligned with the opening in the distal end of the elongated body portion.

4. The apparatus of claim 3 wherein the ferrule holding member defines a storage chamber adapted to store a plurality of ferrules.

5. The apparatus of claim 4 wherein the ferrule holding member comprises means defining an insertion chamber adapted to hold a ferrule in a position in alignment with the opening in the distal end of the elongated body portion.

6. The apparatus of claim 5 further comprising means to automatically advance a ferrule from the storage chamber to the insertion chamber.

7. The apparatus of claim 3 wherein the means to removably attach the ferrule holding member to the elongated body portion comprises resilient lip members extending from the ferrule holding member and adapted to frictionally contact surfaces of the elongated body portion.

8. The apparatus of claim 1 wherein the manual actuating means comprises: a pair of handle members; and pivot means pivotally connecting the pair of handle members together such that they are movable in directions toward and away from each other.

9. The apparatus of claim 8 wherein the pivot means also attaches the ferrule crimping punch means to the pair of handle members.

10. The apparatus of claim 8 wherein the ferrule positioning means comprises an elongated body portion having a proximal end and a distal end, said distal end defining an opening adapted to receive a ferrule, and means to connect the elongated body portion to the pair of handle members.

11. The apparatus of claim 10 wherein the means to connect the elongated body portion to the pair of handle members comprises: a collar member attached to the elongated body portion adjacent to the proximal end thereof; first link means attaching the collar member to a first handle of the pair of handle members; and second link means attaching the collar member to the second handle of the pair of handle members.

12. The apparatus of claim 10 wherein the ferrule crimping punch means comprises a punch member having a distal end and a proximal end attached to the pivot means, the punch member extending through the elongated body portion such that the punch member distal end extends into the opening in the distal end portion of the elongated body portion when the punch member is in it crimping position.

13. The apparatus of claim 1 wherein the tensioning means comprises: a rotatable tension member carried by the tool body including means for engaging a strand element inserted through a ferrule positioned on the tool body; and means for winding a strand element inserted through a ferrule positioned on the tool body about the tension member.

14. The apparatus of claim 13 including clutch means operatively connecting the winding means and the tension member such that the winding means is operatively released from the tension member upon the tension member exerting a predetermined tension on a strand element engaging the tension member and wound thereon while held against longitudinal movement.

15. The apparatus of claim 14 wherein the clutch means comprises: means defining at least one indentation operatively associated with the winding means, the at least one indentation having an inclined ramp surface; at least one protrusion extending from the tension member and located so as to engage the at least one indentation; and biasing means exerting a biasing force on the winding means urging the winding means toward the tension member such that the at least one protrusion drivingly engages the at least one indentation until the tension in a strand element wound around the tension member while restrained against longitudinal movement reaches the predetermined value to thereby cause the at least one protrusion to slide up the inclined ramp surface of the at least one indentation and out of driving engagement with the at least one indentation.

16. The apparatus of claim 15 wherein the biasing means further comprises means to adjust the biasing force exerted on the winding means for adjusting the value of the predetermined tension on a strand element.

17. The apparatus of claim 16 wherein the biasing means comprises: a tension adjusting screw passing through the winding means and threadingly engaging the tension member; and spring means operatively interposed between the adjusting screw and the winding means to exert the biasing force on the winding means.

18. The apparatus of claim 17 wherein the spring means comprises at least one wave spring washer.

19. The apparatus of claim 1 wherein the means to prevent the ferrule crimping punch means from returning toward its retracted position until it has reached its crimping position comprises a ratchet means operatively associated with the manual actuating means.

20. The apparatus of claim 19 wherein the manual actuating means comprises: a pair of handle members; and pivot means pivotally connecting the pair of handle members together such that they are movable in directions toward and away from each other.

21. The apparatus of claim 20 wherein the ratchet means comprises: a ratchet body attached to a first handle of the pair of handle members; a support body attached to the second handle of the pair of handle members; a ratchet member attached to the support body and operatively associated with the ratchet body, the ratchet member defining a plurality of ratchet teeth thereon; and a pawl member operatively associated with the ratchet body so as to operatively engage the ratchet teeth on the ratchet member during relative movement between the ratchet member and the ratchet body upon movement of the handle members towards and away from each other.

22. The apparatus of claim 21 wherein the ratchet pawl defines an engagement edge and further comprising means to pivotally attach the ratchet pawl to the ratchet body.

23. The apparatus of claim 22 further comprising pawl biasing means operatively associated with the ratchet pawl to bias the ratchet pawl to a central position.

24. The apparatus of claim 23 further comprising: a plurality of ratchet teeth defined by the ratchet member, including first ratchet teeth having a first depth which, when the ratchet pawl engages the first ratchet teeth, is insufficient to allow the ratchet pawl to move to its central position; and at least one ratchet groove defined by the ratchet member and having a depth sufficient to allow the ratchet pawl to assume its central position when engaging the ratchet groove.

25. The apparatus of claim 24 further comprising a ratchet groove located at each end of the plurality of first ratchet teeth.

26. The apparatus of claim 8 wherein the locking means comprises: a locking member operatively associated with a first handle of the pair of handle members, the locking member defining a locking recess; a locking pin operatively associated with the second handle of the pair of handle members; and means to move the locking pin between a locked position whereat it engages the locking recess so as to prevent relative movement between the pair of handle members, and a released position whereat it is disengaged from the locking recess so as to permit relative movement between the pair of handle members.

27. The apparatus of claim 26 wherein the tensioning means includes a winding means rotatable about an axis and movable axially along the axis, and means to attach the locking pin to the winding means.

28. The apparatus of claim 27 further comprising means to attach the locking pin to the winding means such that it moves axially with the winding means, but does not rotate with the winding means.

29. Apparatus for applying a ferrule to a strand element such as a wire or a cable comprising: a tool body; a ferrule positioning means carried by the tool body to position a ferrule so that a strand element may be inserted through the ferrule; tensioning means carried by the tool body to apply a predetermined tension to a strand element inserted through a ferrule positioned on the tool body, with the strand element restrained against longitudinal movement; ferrule crimping punch means carried by the tool body; manual actuating means operatively associated with the ferrule crimping punch means to move the ferrule crimping punch means between a retracted position and crimping position whereat it crimps a ferrule positioned on the tool body to affix the ferrule to a strand element inserted through the ferrule; and locking means operatively associated with the tensioning means and the manual actuating means for preventing the manual actuating means from moving the ferrule crimping punch means from its retracted position until a strand element has been tensioned to a predetermined tension.

30. The apparatus of claim 29, including means for severing a strand element inserted through a ferrule positioned on the tool body.

31. The apparatus of claim 30, wherein said severing means comprises an elongated opening in the tool body for receiving a ferrule and strand element receiving aperture disposed towards one side of an intersecting the ferrule receiving opening for enabling a strand element to be inserted through a ferrule disposed in said opening, and wherein ferrule crimping punch means is arranged to cause relative movement between said ferrule in said ferrule receiving opening and said strand element receiving aperture, said strand element receiving aperture including a shearing edge for severing a strand element upon relative movement between a ferrule received in the ferrule opening and through which a strand element has been inserted and crimped thereto and said strand element receiving aperture; said elongated opening comprising a portion of said ferrule positioning means.

* * * * *